United States Patent
Houben et al.

(10) Patent No.: US 7,439,845 B2
(45) Date of Patent: Oct. 21, 2008

(54) TEMPERATURE SENSOR FOR A RESISTANCE THERMOMETER, IN PARTICULAR FOR USE IN THE EXHAUST GAS SYSTEM OF COMBUSTION ENGINES

(76) Inventors: Hans Houben, Flußweg 13, Wörselen (DE) D-52146; Robert Hartmann, Obere Kelterstrasse 7, Tamm (DE) D-71732; Helner Lehmann, Beuzlen 8, Ludwigsburg (DE) D-71642; Werner Schnelder, Ziegelgartenstrasse 11/2, Vaihingon/Enz (DE) D-71665; Amo Marto, Blammerbergstrasse 43, Weil der Stadt (DE) D-71263

( * ) Notice: Subject to any disclaimer, the term of this patent is extended or adjusted under 35 U.S.C. 154(b) by 0 days.

(21) Appl. No.: 11/827,723

(22) Filed: Jul. 13, 2007

(65) Prior Publication Data
US 2008/0036569 A1 Feb. 14, 2008

(30) Foreign Application Priority Data
Jul. 21, 2006 (DE) ........................ 10 2006 034 246

(51) Int. Cl.
*H01C 3/04* (2006.01)
*H01C 7/02* (2006.01)

(52) U.S. Cl. ......................... 338/28; 338/25; 374/185; 374/208; 29/610.1

(58) Field of Classification Search ................... 338/25, 338/28; 374/183, 185, 140, 163, 208; 29/610.1, 29/610.2
See application file for complete search history.

(56) References Cited

U.S. PATENT DOCUMENTS

| | | | | |
|---|---|---|---|---|
| 4,934,831 A | * | 6/1990 | Volbrecht | 374/183 |
| 6,272,735 B1 | * | 8/2001 | Moriwake et al. | 29/612 |
| 6,466,123 B1 | * | 10/2002 | Kuzuoka et al. | 338/25 |
| 6,501,366 B2 | | 12/2002 | Sotoo et al. | |
| 6,639,505 B2 | * | 10/2003 | Murata et al. | 338/25 |

(Continued)

FOREIGN PATENT DOCUMENTS

DE 707557 6/1936

(Continued)

*Primary Examiner*—K. Richard Lee

(57) ABSTRACT

The invention describes a temperature sensor for a, resistance thermometer having an electric measuring resistor the resistance material of which consists either of a ceramic material or of a metallic resistance material in combination with a ceramic or a mineral carrier;

Figure 1:
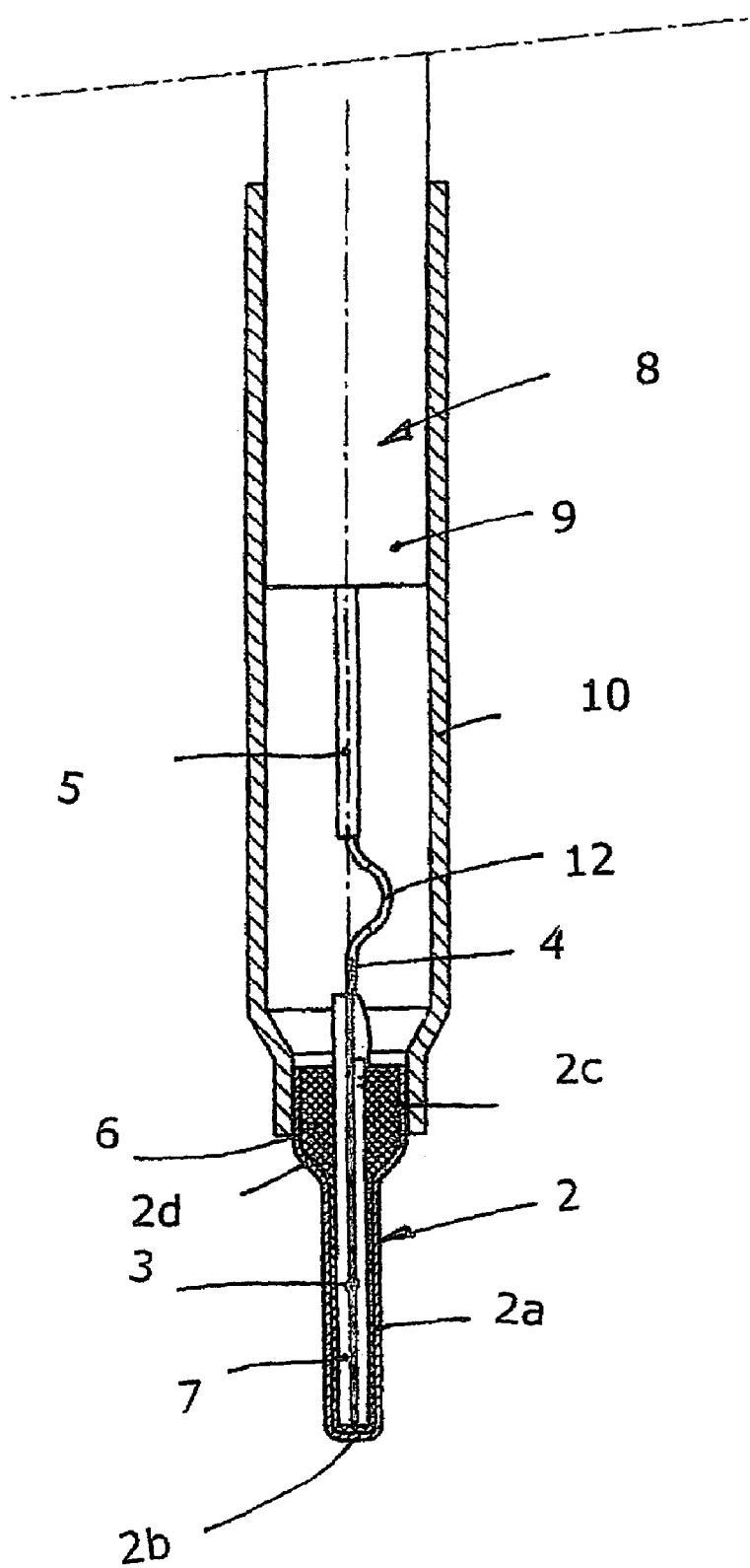

having a protective tube comprising a closed tip and a rear end that provides an access to the inner space of the protective tube and that contains the measuring resistor;

having at least one connection wire of the measuring resistor that is brought out through the rear end of the protective tube;

and having an electrically insulating filler based on a ceramic or a mineral material that fills the space between the protective tube on the one side and the measuring resistor on the other side.

It is provided according to the invention that the filler extends substantially over the length of the measuring resistor, while leaving exposed the at least one connection wire that extends from the carrier;

that the at least one connection wire is connected with an inner conductor of a mineral-insulated or a ceramic-insulated metal-sheathed cable;

that the metal sheath of the cable is connected with the rear end of the protective tube by a metallic sleeve;

and that an expansion compensating means for the at least one connection wire of the measuring resistor is arranged in the sleeve.

20 Claims, 1 Drawing Sheet

U.S. PATENT DOCUMENTS 6,997,607 B2    2/2006    Masaki et al.
7,104,685 B2    9/2006    Hanzawa et al.

FOREIGN PATENT DOCUMENTS

| | | |
|---|---|---|
| DE | 44 24 384 | 9/1998 |
| DE | 100 34 265 A1 | 2/2001 |
| GB | 1175333 | 12/1969 |

* cited by examiner

TEMPERATURE SENSOR FOR A RESISTANCE THERMOMETER, IN PARTICULAR FOR USE IN THE EXHAUST GAS SYSTEM OF COMBUSTION ENGINES

The present invention relates to a temperature sensor for a resistance thermometer having an electric measuring resistor the resistance material of which consists either of a ceramic material or of a metallic resistance material in combination with a ceramic or a mineral carrier, having a protective tube comprising a closed tip and a rear end that provides an access to the inner space of the protective tube and that contains the measuring resistor, having at least one connection wire of the measuring resistor that is brought out through the rear end of the protective tube, and having an electrically insulating filler based on a ceramic or a mineral material that fills the space between the protective tube on the one side and the measuring resistor on the other side.

A temperature sensor of that kind has been known from DE 44 24 384 C2. It comprises a measuring resistor made from a resistance material, especially from platinum, arranged on a planar substrate. A metallic protective tube, equipped with a separate test prod, is provided for receiving the measuring resistor. The test prod consists of a tube, which is closed at its forward end and which is squeezed together, while it is still empty, over its forward section to form a planar narrower portion. A planar measuring resistor, which is introduced into the narrower portion, comprises connection lines that are extended by connection wires brought out through the rear open end of the test prod. After the measuring resistor has been pushed in, a polysilicate-based ceramic compound is filled into the test prod so as to fill the space still available in the test prod and to thereby fully embed the measuring resistor so that nothing but the wires will project from the embedding compound. The test prod so prepared is then welded to a longer metallic protective tube with the tapering test prod projecting from the tube. Inside the longer protective tube the connection wires extend in an air space and are connected with the conductors of a connection cable the sheath of which is fixed in a rear end portion of the protective tube by crimping. Rapid temperature changes with high temperature variation lead to mechanical stresses in the known temperature sensor, which stresses may damage, or even lead to failure of the measuring resistor, its connection lines and their connection points on the ceramic or mineral carrier.

The operating conditions of the temperature sensor in the exhaust gas system of combustion engines are difficult. They are characterized by high temperatures of over 600° C. up to almost 1000° C. with high temperature variation, for example by temperature rises by 800° C. in only 5 seconds, by vibration and by contact with aggressive agents flowing around the sensor. The known temperature sensor does not withstand such conditions. Rapid temperature variations, in connection with the different coefficients of thermal expansion of the metallic connection wires on the one hand and the ceramic embedding compounds on the other hand, result in stresses that act on the connection wires and that may cause the connection wires to break. To leave the largest part of the protective tube free from ceramic embedding compound, as is proposed by DE 44 24 384 C2, does not provide a solution to that problem because the exposed connection wires are at risk to be damaged by the continuous vibrations.

Temperature sensors of the kind disclosed by DE 102 54 637 B4 and DE 199 22 928 A1, where a thermistor embedded in a coagulated ceramic powder, for example aluminum oxide, is connected with a mineral-insulated cable which directly follows the aluminum oxide embedding compound, are connected with similar disadvantages.

DE 100 34 265 A1 discloses a temperature sensor with a measuring resistor located in a closed protective tube where the resistor, instead of being embedded in an insulating ceramic material, is enclosed in an air chamber. The connection cable consists of a mineral-insulated metal-sheathed two-core cable welded to the rear section of the protective tube for the measuring resistor. In that case, the measuring resistor, extending freely in an air chamber, is exposed to the danger of being damaged by vibrations and responds slowly, being efficiently thermally insulated by the air surrounding it. In order to overcome that disadvantage it has been known from DE 101 58 527 A1 to provide openings in the tip of the protective tube, in the area of the measuring resistor, that permit the exhaust gas to enter the inner space and to flow around the measuring resistor. While this has the result that the temperature sensor responds to temperature variations more quickly, the measuring resistor is exposed to chemical attack by the exhaust gases, tends to get soiled by deposition of unburnt fuel residues, especially soot and condensate, which leads to the additional risk that an electric shunt will build up been the supply lines of the measuring resistor. Moreover, measuring resistors intended for being exposed to the exhaust gas in an open protective tube are considerably more expensive than measuring resistors that are intended for use in closed protective tubes.

The demands placed on temperature sensors that are to be used in the exhaust gas system of combustion engines, which in part oppose each other, make it difficult to find a temperature sensor for use in the exhaust gas system of combustion engines of vehicles which not only is available at low cost but is also reliable, mechanically stable, durable, insensitive to chemical attack by the hot exhaust gas and which should respond quickly to temperature variations.

That object is achieved by a temperature sensor for a resistance thermometer having an electric measuring resistor the resistance material of which consists either of a ceramic material or of a metallic resistance material in combination with a ceramic or a mineral carrier, having a protective tube comprising a closed tip and a rear end that provides an access to the inner space of the protective tube and that contains the measuring resistor, having at least one connection wire of the measuring resistor that is brought out through the rear end of the protective tube, and having an electrically insulating filler based on a ceramic or a mineral material that fills the space between the protective tube on the one side and the measuring resistor on the other side.

The filler extends substantially over the length of the measuring resistor, while leaving exposed the at least one connection wire that extends from the carrier;

the at least one connection wire is connected with an inner conductor of a mineral-insulated or a ceramic-insulated metal-sheathed cable;

the metal sheath of the cable is connected with the rear end of the protective tube by a metallic sleeve;

and an expansion compensating means for the at least one connection wire of the measuring resistor is arranged in the sleeve.

Advantageous further developments of the invention are the subject-matter of the sub-claims.

The temperature sensor according to the invention comprises an electric measuring resistor the resistance material of which consists either of a ceramic material or of a metallic resistance material in combination with a ceramic or a mineral carrier. The measuring resistor is contained in a protective tube having a closed tip and a rear end that provides access to the inner space of the protective tube. At least one connection wire of the measuring resistor is brought out through the rear end of the protective tube. A second connection wire of the measuring resistor is either likewise brought out through the rear end of the protective tube or connected with the tip of the protective tube; in the latter case, the protective tube not only acts to protect the measuring resistor, but also serves as one of its supply lines. Inside the protective tube, the measuring resistor is embedded in a filler based on a ceramic or a mineral material. The filler extends substantially over the full length of the measuring resistor. The statement that the filler extends "substantially" over the full length of the measuring resistor is meant to say that the measuring resistor, being arranged on a ceramic or a mineral carrier, is thoroughly wrapped up and protected from vibration stresses in the protective tube. That aim can be likewise achieved when the measuring resistor is not fully embedded in the filler. If and to the extent the measuring resistor is not fully embedded in the filler, heat transfer from the protective tube to the measuring resistor is hindered so that the measuring resistor will respond to temperature changes more slowly. However, heat transfer from the protective tube to the measuring resistor results in part also from the circumstance that the filler transfers the heat to the ceramic carrier of the measuring resistor and that the carrier would transfer the heat also to a section of the measuring resistor not embedded in the filler. It is intended that cases, where the fact that measuring resistor is not enclosed by the filler is of minor importance or negligible with respect to the response of the measuring resistor to temperature variations, are also to be covered by the scope of protection, and this is what is meant by the statement that "the filler extends substantially over the full length of the measuring resistor". On the other hand, the at least one connection wire, brought out through the rear end of the protective tube, should not be embedded in the filler; it is connected with an inner conductor of a metal-sheathed mineral-insulated or ceramic-insulated cable. That cable serves for connecting the temperature sensor to an evaluation unit and/or to a display unit and/or to a control unit which may also be integrated in a single unit. The metal sheath of the cable is connected to the rear end of the protective tube by a metallic sleeve. Inside the metallic sleeve, there is provided an expansion compensating means for the at least one connection wire of the measuring resistor, which is connected to the inner conductor of the cable.

By combining these features it has been possible to optimize the temperature sensor in a way that presents quite a number of advantages that could not be united before in view of the different demands placed on the temperature sensor which in part even were opposed one to the other.

The measuring resistor is enclosed and protected by a closed protective tube so that it is not exposed to attack by the hot exhaust gases. Rather, the hot exhaust gases act exclusively on the protective tube, for which suitable highly heat-resistant and chemically resistant metals and metal alloys are known.

The protective tube can be produced and used as a single piece, which is favorable in terms of low-cost production.

The measuring resistor is embedded in a ceramic filler which on the one hand protects the measuring resistor from vibration stresses typical for the particular application, and on the other hand provides efficient heat transfer from the protective tube to the electric measuring resistor so that the latter will quickly respond to temperature variations.

By having the at least one connection wire, brought out from the rear end of the protective tube, not embedded in the filler any differences in thermal expansion of the connection wires and the filler cannot strain the connection wires. The smaller the mass of the connection wire, the higher is their resistance to vibration. The risk that the connection wires may break as a result of mechanical stresses induced by temperature variations and that the temperature sensor may fail in consequence is kept small according to the invention by providing expansion compensating means for the at least one connection wire. Conveniently, the expansion compensating means are enclosed in a sleeve that connects the protective tube with the metallic sheath of a ceramic-insulated or mineral-insulated connection cable, in particularly by welding or brazing. That sleeve advantageously serves to accommodate the expansion compensating means. The latter may consist of a spring element. An especially suitable solution is obtained when the expansion compensating means is configured as a bent section of the at least one connection wire and/or of the inner conductor of the mineral-insulated or ceramic-insulated cable fixed thereon. In the air space between the rear end of the protective tube and the forward end of the cable, the expansion compensating means can compensate, without any risk, any thermal stresses that otherwise may lead to damage to the connection wires.

The sleeve provides the additional advantage that it may simultaneously serve as carrier for a temperature sensor adapted to the particular application. The sleeve may be provided, for example, with a mounting flange or a threaded bush by means of which the temperature sensor can be fixed in its intended location. On the other hand, the tip of the temperature sensor, being formed by the protective tube and the measuring resistor arranged in it, may remain unchanged for different applications and may be connected as unchanged standard component with different sleeves or differently armored sleeves.

The filler protects the protective tube preferably up to its rear end. This means that the carrier of the measuring resistor, from which the at least one connection wire of the measuring resistor extends, projects a certain distance beyond the rear end of the protective tube and into the sleeve that connects the protective tube with the metal sheath of the cable.

In order to facilitate establishment of that, connection, the protective tube preferably comprises a cylindrical rear section and a narrower forward section, compared with the rear section, and a transition portion between the two sections. The narrower section is intended to keep the thickness of the filler between the protective tube and the measuring resistor small, this being favorable in terms of rapid response of the temperature sensor to temperature variations. When the narrower section of the protective tube is given a substantially cylindrical shape, filling the protective tube will be facilitated. A favorable effect with respect to the response of the measuring resistor is achieved when the cross-sectional shape of the narrower section is adapted to the cross-section of the measuring resistor and its carrier. Preferably, the forward section of the protective tube, except for a rounded portion at its tip, exhibits a substantially constant cross-section.

Especially well suited as a filler is magnesium oxide, that material being highly temperature-resistant, available at low cost and easy to process. Further suited as filler are aluminum oxide, aluminum nitride and polysilicates in the form of powder. Ceramic casting compounds, ceramic adhesives and highly temperature-resistant heat-transfer pastes are particularly well suited as fillers. One example of a suitable ceramic casting compound, which sets by chemical reaction and which is stable at 1650° C., is sold by Panacol-Elosol GmbH in D-61440 Oberursel, under the trade name CERASTIL V336. An example of a suitable ceramic adhesive is sold by Cotronics Corp. in Brooklyn, N.Y. 11235, under the trade name CONTRONICS 906.

Suitable for use as measuring resistors in the temperature range of 600° C. to approximately 1000° C. are ceramic NTC resistors, i.e. ceramic measuring resistors with negative temperature coefficient. Flat measuring resistors are especially preferred for purposes of the invention. Flat measuring resistors consist of a metallic resistance material that is printed onto a flat ceramic carrier, also described as substrate. Aluminum oxide wafers have proven their value as substrates. As a protective measure for the resistance material the latter may also be sandwiched between two ceramic wafers. Measuring resistors made from platinum or from a platinum alloy, especially Pt-100 or Pt-200 resistors, i.e. platinum resistors having a resistance of 100 ohms or 200 ohms, respectively, at a temperature of 0° C., are particularly well suited. Such resistors may be printed onto an aluminum substrate and may have connection wires made from a corresponding highly temperature-resistant metal, for example likewise from platinum or a platinum alloy. In most of the cases, however, connection wires made from platinum have a short length only and are extended by low-cost connection wires made from a different highly temperature-resistant metal, such as an FeNiCr alloy.

Protective tubes that are cable of withstanding the high temperatures and chemical attack in the exhaust gas are known. Examples include highly temperature-resistant nickel alloys, for example Inconel alloys, especially Inconel 600, Inconel 601 and Inconel 602. Inconel alloys are a family of highly temperature-resistant nickel-based superalloys that are particularly resistant to oxidation and other corrosion. Inconel 600, for example, contains 72% nickel, 16% chromium and 8% iron.

It is a particular advantage of the invention that the temperature sensor can be prefabricated in standard dimensions and can then be connected to a holder adapted to the conditions of the particular application, to form a temperature sensor ready for being mounted, for example for being screwed in.

FIG. 1 shows a longitudinal cross-section of one embodiment of a temperature sensor.

The temperature sensor 1 illustrated in FIG. 1 comprises on a ceramic carrier 7a in a protective tube a measuring resistor 3 with two connection wires 4. The measuring resistor 3 and its carrier 7 are embedded in a ceramic or mineral filler 6.

Preferably, the measuring resistor 3 is a platinum resistor printed onto a ceramic wafer that serves as carrier 7.

The protective tube 2 has a slim cylindrical forward section 2a with a closed blunt end 2b, a cylindrical rear section 2b with a diameter larger than the diameter of the forward section 2a, and a conical transition portion 2d. Alternatively, the closed end 2b may be rounded and/or the transition portion 2d may be stepped.

In order to achieve rapid response of the temperature sensor, the measuring resistor 3 and its carrier 7, and the diameter of the forward section 2a of the protective tube 2, are adapted one to the other so that an unnecessarily big spacing is avoided between the carrier 7 with the measuring resistor 3 and the protective tube 2.

The protective tube 2 is made from a highly heat-resistant material, for example from Inconel 600. The filler 6 consists, for example, of magnesium oxide powder, aluminum oxide powder or aluminum nitride powder, preferably of a ceramic casting compound such as Cerastil V336. After the measuring resistor 3 has been introduced into the protective tube 2, the filler 6 is filled in so as to enclose the measuring resistor 3. In the case of fillers in powder form this can be done by filling in the material by steps while simultaneously tapping or shaking the tube, followed by a subsequent compacting step. If a casting compound is used, which is preferred, the compound is poured in and permitted to set.

The exposed connection wires 4 are connected, for example by welding, brazing or crimping, with the inner conductors 5 of a two-core connection cable 8 the sheath 9 of which is made from metal. In the course of that operation, a loop 12 is formed from the connection wires 4 that provides an expansion compensating means.

For connecting the protective tube 2 with the sheath 9 of the connection cable 8, there is provided a metallic sleeve 10 one end of which is slid onto the rear section 2c of the protective tube 2 and is conveniently welded or brazed to the latter. The other end of the sleeve 10 serves to receive the connection cable 8 whose two inner conductors 5 are to be connected to the connection wires 4 of the measuring resistor 3. The connection can be made by welding, brazing or crimping.

The inner conductors 5 in the connection cable 8 are insulated from the sheath 9 by a ceramic or mineral insulating material. Especially well suited as insulating materials are aluminum oxide and magnesium oxide.

For adapting the unit to different operating conditions, the sleeve 10 may be provided, for example, with a mounting flange or a threaded bush which permits the temperature sensor 1 to be screwed in at the site.

The protective tube 2 with the measuring resistor 3 may be used as standard component that remains unchanged and can be connected with sleeves 10 of various configuration and with connection cables 8 of different lengths.

LIST OF REFERENCE NUMERALS

1. Temperature sensor
2. Protective tube
2a. Forward section
2b. Blunt end of 2a
2c. Rear section
2d. Transition portion
3. Measuring resistor
4. Connection wires
5. Inner conductor
6. Filler
7. Carrier
8. Cable
9. Sheath
10. Sleeve
12. Expansion compensating means

The invention claimed is:

1. Temperature sensor for a resistance thermometer
having an electric measuring resistor the resistance material of which consists either of a ceramic material or of a metallic resistance material in combination with a ceramic or a mineral carrier;
having a protective tube comprising a closed tip and a rear end that provides an access to the inner space of the protective tube and that contains the measuring resistor;
having at least one connection wire of the measuring resistor that is brought out through the rear end of the protective tube;

and having an electrically insulating filler based on a ceramic or a mineral material that fills the space between the protective tube on the one side and the measuring resistor on the other side, wherein the filler extends substantially over the length of the measuring resistor, while leaving exposed the at least one connection wire that extends from the carrier;

that the at least one connection wire is connected with an inner conductor of a mineral-insulated or a ceramic-insulated metal-sheathed cable;

that the metal sheath of the cable is connected with the rear end of the protective tube by a metallic sleeve;

and that an expansion compensating means for the at least one connection wire of the measuring resistor is arranged in the sleeve.

2. The temperature sensor as defined in claim 1, wherein the expansion compensating means has a resilient design.

3. The temperature sensor as defined in claim 1, wherein the expansion compensating means is a bent section of the at least one connection wire and/or of the inner conductor of the cable fixed thereon.

4. The temperature sensor as defined in claim 1, wherein the filler fills the protective tube up to its rear end and that the carrier projects beyond the rear end of the protective tube and into the sleeve.

5. The temperature sensor as defined in claim 1, wherein the protective tube comprises a cylindrical rear section, a narrower forward section, compared with the rear section, and a transition portion.

6. The temperature sensor as defined in claim 5, wherein the forward section of the protective tube exhibits a substantially constant cross-section.

7. The temperature sensor as defined in claim 1, wherein the protective tube consists of a metal.

8. The temperature sensor as defined in claim 7, wherein the protective tube consists of a highly temperature-resistant alloy, especially of a nickel alloy such as Inconel, especially of Inconel 600 or of Inconel 601.

9. The temperature sensor as defined in claim 1, wherein magnesium oxide powder, aluminum oxide powder, aluminum nitride powder or mixtures thereof are provided as the filler.

10. The temperature sensor as defined in any of claim 1, wherein a ceramic casting compound, a ceramic adhesive or a highly temperature-resistant heat-transfer paste is provided as filler.

11. The temperature sensor as defined in claim 1, wherein the measuring resistor has a negative temperature coefficient.

12. The temperature sensor as defined in claim 1, wherein the measuring resistor is a flat measuring resistor.

13. The temperature sensor as defined in claim 1, wherein the measuring resistor is formed using platinum or a platinum alloy.

14. The temperature sensor as defined in claim 13 in which the measuring resistor is a Pt-100 or Pt-200 resistor.

15. The temperature sensor as defined in claim 12 in which the measuring resistor is formed using platinum or a platinum alloy as the resistance material.

16. The temperature sensor as defined in claim 2, wherein the expansion compensating means is a bent section of the at least one connection wire and/or of the inner conductor of the cable fixed thereon.

17. The temperature sensor as defined in claim 2, wherein the filler fills the protective tube up to its rear end and that the carrier projects beyond the rear end of the protective tube and into the sleeve.

18. The temperature sensor as defined in claim 3, wherein the filler fills the protective tube up to its rear end and that the carrier projects beyond the rear end of the protective tube and into the sleeve.

19. The temperature sensor as defined in claim 16, wherein the filler fills the protective tube up to its rear end and that the carrier projects beyond the rear end of the protective tube and into the sleeve.

20. The temperature sensor as defined in claim 2, wherein the protective tube comprises a cylindrical rear section, a narrower forward section, compared with the rear section, and a transition portion.

* * * * *